(12) United States Patent
Brown et al.

(10) Patent No.: US 7,739,300 B2
(45) Date of Patent: Jun. 15, 2010

(54) SYSTEM AND METHOD FOR PROCESSING A PRIORITIZING PROTOCOL

(75) Inventors: Douglas Brown, Rancho Santa Fe, CA (US); Anita Richards, San Juan Capistrano, CA (US); Caroline Ballinger, Culver City, CA (US); Thomas Greene, Poway, CA (US)

(73) Assignee: Teradata US, Inc., Miamisburg, OH (US)

( * ) Notice: Subject to any disclaimer, the term of this patent is extended or adjusted under 35 U.S.C. 154(b) by 959 days.

(21) Appl. No.: 11/468,425

(22) Filed: Aug. 30, 2006

(65) Prior Publication Data

US 2007/0061290 A1    Mar. 15, 2007

Related U.S. Application Data

(60) Provisional application No. 60/715,817, filed on Sep. 9, 2005.

(51) Int. Cl.
*G06F 17/30* (2006.01)

(52) U.S. Cl. .................. 707/781; 707/951; 718/103

(58) Field of Classification Search .......... 707/100, 707/101, 104.1; 718/103, 104, 105
See application file for complete search history.

(56) References Cited

U.S. PATENT DOCUMENTS

| | | | | |
|---|---|---|---|---|
| 5,603,029 A | * | 2/1997 | Aman et al. | 718/105 |
| 6,249,800 B1 | * | 6/2001 | Aman et al. | 718/105 |
| 6,718,330 B1 | * | 4/2004 | Zenner | 707/10 |
| 6,859,926 B1 | * | 2/2005 | Brenner et al. | 718/100 |
| 7,093,250 B1 | * | 8/2006 | Rector | 718/100 |
| 7,137,119 B1 | * | 11/2006 | Sankaranarayan et al. | 718/103 |
| 7,359,905 B2 | * | 4/2008 | Tunning et al. | 707/100 |
| 7,509,671 B1 | * | 3/2009 | Bedell et al. | 726/6 |
| 2004/0267762 A1 | * | 12/2004 | Tunning et al. | 707/100 |
| 2006/0026179 A1 | * | 2/2006 | Brown et al. | 707/100 |

\* cited by examiner

*Primary Examiner*—Leslie Wong

(57) ABSTRACT

A system for processing a prioritizing protocol for a database, the system including an interface for nominating a first prioritizing protocol that maps a plurality of user accounts to one or more performance groups and to one or more periods; a processor that is responsive to the interface for defining a second prioritizing protocol; and an output in communication with the processor for exporting the second prioritizing protocol. The processor defines the second prioritizing protocol by defining a plurality of workload classes; associating each user account to a particular workload class; and mapping each workload class to a workload weight. The system provides a mechanism for DBMS administrators to migrate their systems from user-centric management to workload-centric management, wherein many DBMS components require updating, replacement or modification.

21 Claims, 17 Drawing Sheets

| Resource Partition Name | Resource Partition Weight | Performance Group Name | Active Status | Performance Group Weight | Relative weight | Associated Workload Class |
|---|---|---|---|---|---|---|
| RP0 | 20 | AG1 | N | 5 | 1% | |
| | | AG2 | N | 10 | 3% | |
| | | AG3 | Y | 20 | 5% | Call Center Tactical |
| | | AG4 | N | 40 | 10% | |
| RP1 | 60 | AG11 | Y | 5 | 4% | CRM Demoted |
| | | AG12 | Y | 10 | 8% | CRM Lo Pri |
| RP2 | 25 | AG13 | Y | 20 | 15% | CRM High Pri |
| | | AG14 | Y | 40 | 30% | CRM Tactical |
| | | AG21 | Y | 10 | 2% | DSS Demoted |
| | | AG22 | Y | 20 | 4% | Batch Loads |
| | | AG23 | Y | 30 | 6% | DSS Queries |
| | | AG24 | N | 60 | 12% | |

Figure 3

| Resource Partition Name | Resource Partition Weight | Workload Class Identifier | Enforcement Priority | Workload Weight | Previous Relative weight | Relative Weight | Workload Class Name |
|---|---|---|---|---|---|---|---|
| Default (RP0) | 20 | AG3 | Not Required | 20 | 19% | 19% | WD-CALLCTR |
| RP1 | 60 | AG11 | Not Required | 5 | 4% | 4% | WD-CRM_D |
| | | AG12 | Not Required | 10 | 8% | 8% | WD-CRM_LO |
| | | AG13 | Not Required | 20 | 15% | 15% | WD-CRM_HI |
| | | AG14 | Not Required | 40 | 30% | 30% | WD-CRM_T |
| RP2 | 25 | AG21 | Not Required | 10 | 4% | 4% | WD-DSS_D |
| | | AG22 | Not Required | 20 | 8% | 8% | WD-BATCH, WD-DEFAULT |
| | | AG23 | Not Required | 30 | 12% | 12% | WD-REPORTS |

Figure 4

| Resource Partition Name | Resource Partition Weight | Workload Class Identifier | Enforcement Priority | Workload Weight | Previous Relative weight | Relative Weight | Workload Class Name |
|---|---|---|---|---|---|---|---|
| Default (RP0) | 25 | AGL | | 5 | | | |
| | | AGM | | 10 | | | |
| | | AGH | | 20 | | | |
| | | AGR | | 40 | | | |
| Tactical (RP1) | 49 | AG3 | Tactical | 19 | 19% | 15% | WD-CALLCTR |
| | | AG14 | Tactical | 30 | 30% | 24% | WD-CRM_T |
| Standard (RP2) | 51 | AG11 | Background | 4 | 4% | 3% | WD-CRM_D |
| | | AG12 | Normal | 8 | 8% | 6% | WD-CRM_LO |
| | | AG13 | Priority | 15 | 15% | 12% | WD-CRM_HI |
| | | AG21 | Background | 4 | 4% | 3% | WD-DSS_D |
| | | AG22 | Normal | 8 | 8% | 6% | WD-BATCH, WD-DEFAULT |
| | | AG23 | Background | 12 | 12% | 10% | WD-REPORTS |

Create Workload Summary

Create Workload Summary

Selected Period: Default ▽    Configuration Name: SteveH_TWA_Jul15

The workloads defined so far are listed here. The highlighted workload needs further refinement.

| S.N | Workload | Classify | CPU % | I/O % | StdDev of | Arrival | Respons | Avg. CP |
|---|---|---|---|---|---|---|---|---|
| 1 | WD-DEFA | WD-DEFA Accounts | 0.000 | 0.000 | 0.000 | 0.000 | 0.000 | 0.000 |
| 2 | WD-$MAN | WD-$MAN Accounts | 54.312 | 34.264 | 6.250 | 4.091 | 345.933 | 307.195 |
| 3 | WD-$LRE | WD-$LRE Accounts | 43.834 | 27.272 | 131.751 | 14.545 | 97.629 | 69.732 |
| 4 | WD-$HCA | WD-$HCA Accounts | 1.809 | 37.521 | 0.062 | 791.182 | 1.046 | 0.053 |
| 5 | WD-DBA | WD-DBA Accounts | 0.067 | 1.432 | 0.475 | 195.000 | 1.963 | 0.186 |

[Create]   [Cancel]

SYSTEM AND METHOD FOR PROCESSING A PRIORITIZING PROTOCOL

CROSS REFERENCE TO OTHER APPLICATIONS

This application claims priority under 35 U.S.C. §119(e) to the following and commonly-assigned patent application, which is incorporated herein by reference: Provisional Application Ser. No. 60/715,817, entitled "A SYSTEM AND METHOD FOR PROCESSING A PRIORITIZING PROTOCOL," filed on Sep. 9, 2005.

BACKGROUND

Any discussion of the prior art throughout the specification should in no way be considered as an admission that such prior art is widely known or forms part of common general knowledge in the field.

As database management systems continue to increase in function and expand into new application areas, the diversity of database workloads is increasing as well. In addition to the classic relational DBMS workload consisting of short transactions running concurrently with long decision support requests workloads comprising of an even wider range of system demands are expected.

Most known databases implement user-centric management. That is, incoming requests are separated and managed in response to the characteristics of users that submit the requests. To cope with this wider range of system demands, DBMS have been developed that use workload-centric management. That is, they separate and manage requests in response to characteristics of the individual requests.

As DBMS administrators migrate their systems from user-centric management to workload-centric management, many DBMS components require updating, replacement or modification. In many cases a great deal of time and money has been expended on personalizing complex settings in these components for a particular administrator's needs.

Throughout the specification, reference is made to the terms "workload class", "workload group" and workload definition". Those skilled in the art will recognize these terms as substantially synonymous. That is, the terms each relate to the same general identification structure used to separate requests for prioritization, processing and performance monitoring in a CLSM database system.

SUMMARY

It is an object of the present invention to overcome or ameliorate at least one of the disadvantages of the prior art, or to provide a useful alternative.

In accordance with a first aspect of the invention, there is provided a system for processing a prioritizing protocol for a database, the system including:
  an interface for nominating a first prioritizing protocol that maps a plurality of user accounts to one or more performance groups and to one or more periods;
  a processor that is responsive to the interface for defining a second prioritizing protocol by:
    defining a plurality of workload classes;
    associating each user account to a particular workload class; and
    mapping each workload class to a workload weight; and
  an output in communication with the processor for exporting the second prioritizing protocol.

In accordance with a further aspect of the invention, there is provided a method for processing a prioritizing protocol for a database, the method including the steps of:
  nominating a first prioritizing protocol that maps a plurality of user accounts to one or more performance groups and to one or more periods;
  defining a second prioritizing protocol by:
    defining a plurality of workload classes;
    associating each user account to a particular workload class; and
    mapping each workload class to a workload weight; and
  exporting the second prioritizing protocol.

BRIEF DESCRIPTION OF THE DRAWINGS

The benefits and advantages of the present invention will become apparent to those skilled in the art to which this invention relates from the subsequent description of exemplary embodiments and the appended claims, taken in conjunction with the accompanying drawings, in which:

FIG. 3 is a table setting out exemplary performance groups and weights;

FIG. 4 is a table setting out workload classes and weights based on FIG. 3;

FIG. 5 is a table setting out workload classes and weights based on FIG. 3, under an alternate mapping scheme;

FIGS. 10 to 20 are exemplary screenshots from PSF migration in accordance with an embodiment of the invention.

DETAILED DESCRIPTION

Figure 1:
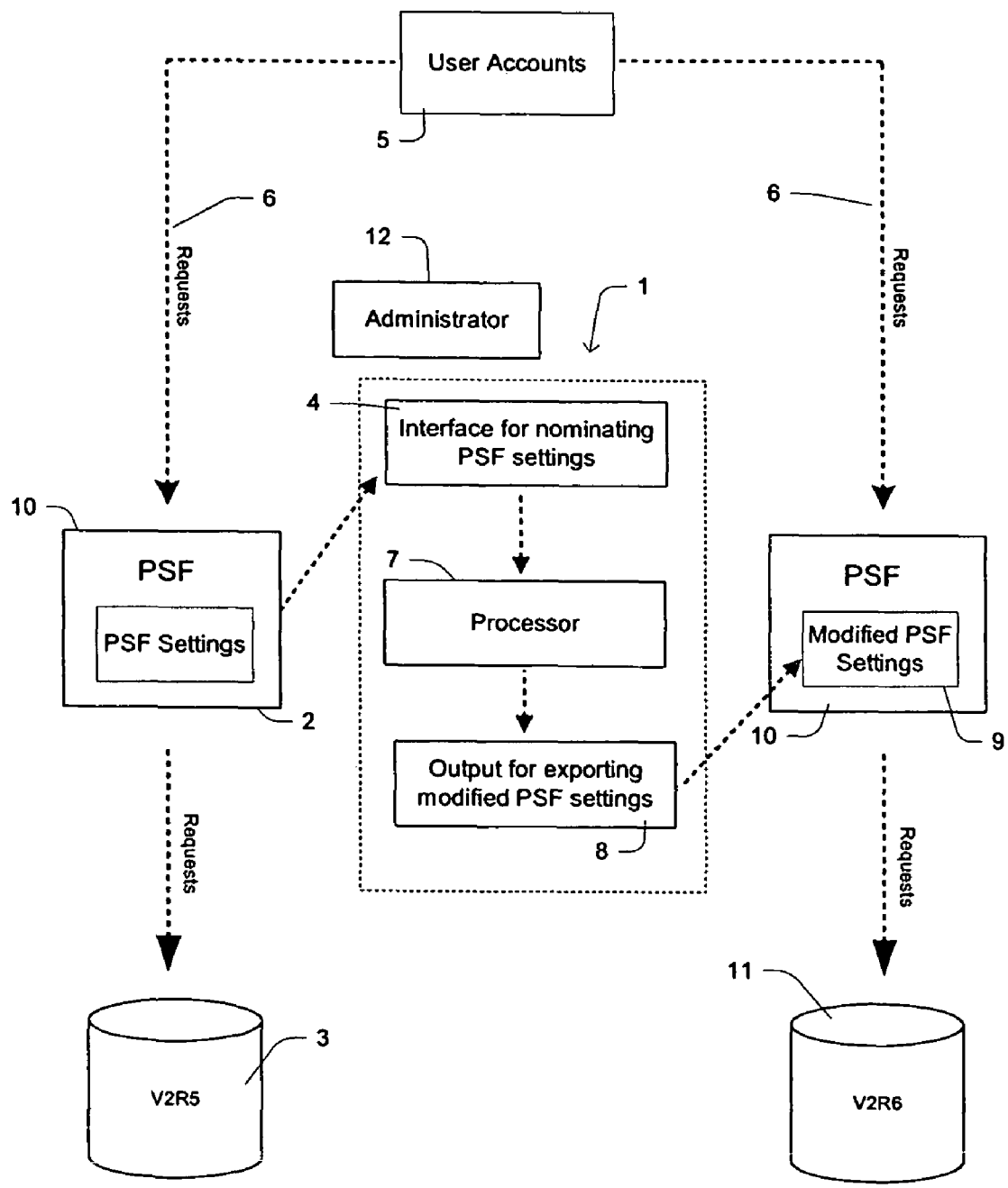
FIG. 1 is a schematic representation of a system according to an embodiment of the present invention.

Referring to the drawings, it will be appreciated that, in the different figures, corresponding features have been denoted by corresponding reference numerals. It will also be appreciated that literals have been provided on generic objects for the sake of explanation only, and these literals are in no way meant to be limiting on the generic objects.

Referring initially to FIG. 1, there is provided a system 1 for processing a prioritizing protocol 2 for a database 3. System 1 includes an interface 4 for nominating prioritizing protocol 2. Protocol 2 maps a plurality of users accounts 5 to one or more performance groups and to one or more periods. Accounts 5 are defined for users that submit requests 6 to database 3. It will be appreciated that when a user is defined in database 3, the user is associated with an account having an account string. The account string maps the user account to a performance group, and various functionalities are responsive to this account string for obtaining performance group particulars for the user account. For example, a user account A is defined for a group of users X. An account string is created by a command along the lines of:

Create User 'A' Account='$PGHIGH'
Create User 'A' Account='$PGRUSH'

As such, when a user X submits a request using user account A, that request is identified as being of priority group 'HIGH' by reference to the account string.

System 1 also includes a processor 7 that is responsive to interface 4 for defining a plurality of workload classes. Processor 7 then associates each user account 5 to a particular workload class, and maps each workload class to a workload weight. Processor 7 is also able to map each workload class to an enforcement priority and a workload classification. An output 8 in communication with processor 7 exports a second prioritizing protocol 9.

Protocol 2 is indicative of a group of settings used by a priority scheduling application 10. Application 10 receives and prioritizes requests 6 from user accounts 5 before passing them for processing in database 3. These settings have been developed on the basis of database 3 operating under a user account-centric management structure. As such, protocol 2 maps a group weight to a performance group to which user accounts 5 are assignable. As such, each user has an associated group weight. Protocol 2 prioritizes requests 6 from a user account 5 in response to the associated group weight of that user account 5.

System 1 processes protocol 2 to derive protocol 9. Protocol 9 is indicative of a group of settings for use by application 10. However, the settings have been updated for use with a database 11 that operates under a workload-centric management structure. Protocol 9 maps a workload weight to a performance group to which requests are attributable such that each request has an attributed workload weight. It prioritizes a request 6 from a user account 5 in response to the attributed workload weight of that request.

Databases 3 and 11 contain substantially the same data—the difference relates to the overall DBMS used. In a specific example, which is detailed further below, database 3 uses TeredataV2R5, whilst database 11 uses Teradata V2R6. In that example application 10 is in the form of Teradata Priority Scheduler Facility (PSF). Those skilled in the art will recognize system 1 as being appropriate for such a situation.

In the present example, a request 6 from a user account 5 has an associated group weight and an equal attributed workload weight. It will be appreciated that, as such, queries are prioritized by application 10 in substantially the same fashion. As such, expended effort in developing the settings that define protocol 2 is not wasted, as the settings are used similarly by protocol 9. That being said, over time the settings that define protocol 9 are likely to be modified. This modification occurs both at the command of an administrator 12, or as a result of a built-in feedback mechanism within database 11, such as a CLSM-type regulator.

Although, in this disclosure, reference is made to a performance group being mapped to a group weight, it is appreciated that in many situation this mapping occurs though in intermediate allocation group. This intermediate mapping purpose is generally ignored for the sake of the present disclosure, although it is useful in practice. As such, where the specification reads X is mapped to Y, it is meant to also include the case of where X is mapped to Z, which is mapped to Y.

Figure 7:
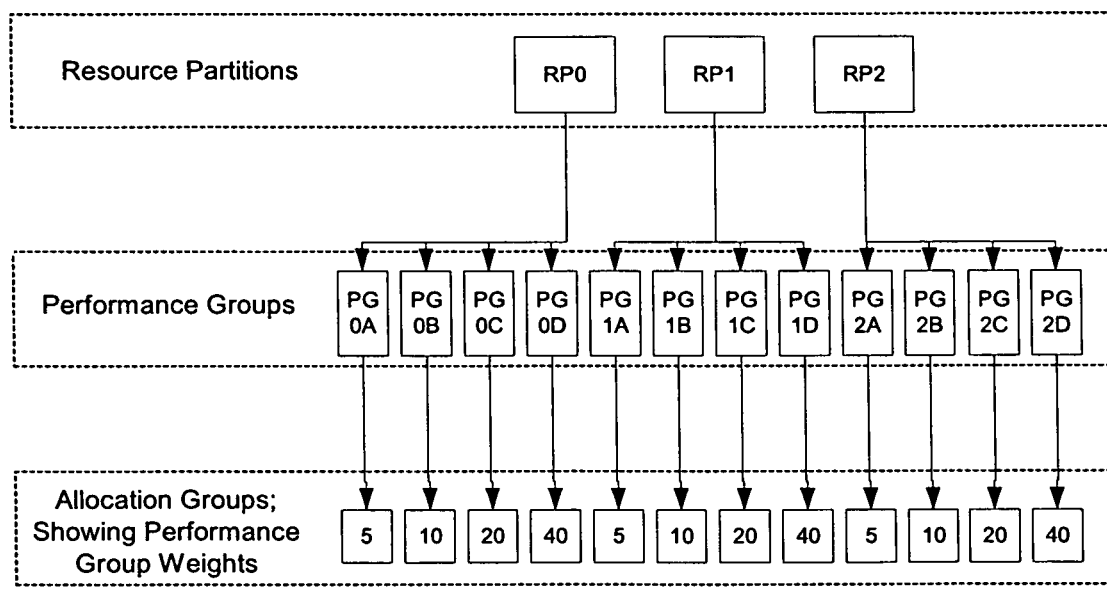
FIG. 7 is a schematic illustration of PSF weight mapping under V2R5

Under some known prioritizing protocols, such as protocol 2, each group weight belongs to one of a plurality of existing resource partitions. Each resource partition has its own respective weight. In the case of PSF, the mapping of performance groups, resource partitions and performance group weights is best shown in FIG. 7.

At this stage, it is relevant to consider the notions of weights and relative weights. A weight, such as a group weight or a workload weight, is a typically represented by an integer. This integer is then processed in accordance with principles to derive a relative weight. This relative weight, expressed as a percentage, denotes the proportion of available processing in database 3 or 11 that is provided to the group or workload to which the relative weight relates. The relative weight changes depending on how many groups are "active". An active group is a group that is submitting one or more requests. As a simple example, consider two groups with equal weights. If both of these are active, they should have an equal share of processing—relative weights of 50%. However, if one of not active, the other should have 100%, otherwise processing is being wasted.

In the case of protocol 2, the relative group weights are calculated as follows. The example uses an exemplary performance group, group A. The relative group weight for group A is calculated by firstly dividing the group weight of group A by the sum of the weights of all other active performance groups within the resource partition. This is then multiplied by the weight of the resource partition to which group A belongs divided by the sum of the weights of all active resource partitions. It will be appreciated that this second calculation is only necessary in situations where multiple resource partitions are used. It will further be appreciated that the same calculations are used for workload weights.

In the present embodiment, system 1 provides two options in relation to resource partitions: 'as-is' mapping or 'simplified' mapping. Administrator 12 selects one of these.

Figure 8:
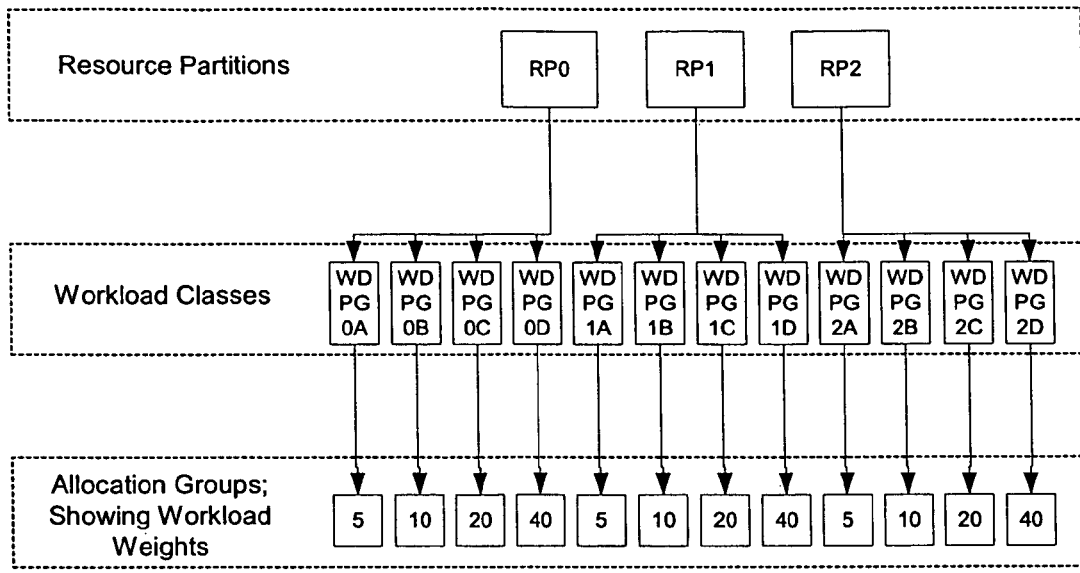
FIG. 8 is a schematic illustration of PSF weight mapping following processing by one embodiment of the invention.

Under 'as-is' mapping, each workload weight in protocol 9 belongs to the same existing resource partition as its equal group weight in protocol 2. It will be appreciated that, under 'as-is' mapping, where a workload weight is equal to a group weight, the relative workload weight is equal to the relative group weight, assuming the same level of activity. This is best illustrated in FIG. 8, which is based off FIG. 7.

Under 'simplified' mapping, equal workload weight in protocol 9 is mapped to one of a plurality of simplified resource partitions defined by processor 7. In the present example, processor 7 defines three simplified partitions: "default", "tactical" and "standard". Administrator 12 allocates an "enforcement priority" to each workload class. An enforcement priority categorizes a workload as being of a particular nature. In the present example the enforcement priorities are "tactical", "priority", "background" and "normal". Each enforcement priority corresponds to one of the simplified resource partitions, and this directs the mapping. In this case, processor 7 maps the workload weights for tactical workloads to the tactical resource partition, and the workload weights for background, priority and normal queries to the standard partition. The default partition is reserved for internal system work runs, or other requests provided by console utilities. For example: loads, dumps, restores and the like. These are prioritized among themselves by enforcement priorities "rush", "high", "medium" and "low". In some embodiments other workload classes are mapped to the default partition by choice.

In the present example, the weights for each of the simplified partitions are determined as follows. The weight of the tactical resource partition is the sum of the relative weights of all tactical workloads. The weight of the standard resource partition is the sum of the relative weights of all remaining workloads. The weight of the default partition is a quarter of the sum of the weights of the tactical and standard resource partitions.

An example of simplified mapping is shown in FIG. 9, again based on FIG. 7. It will be appreciated that workloads WDPG2A, WDPG2B, WDP2C, and WDPG2D have been given an enforcement priority of "tactical" and have been mapped to the tactical partition. The remaining workloads have been mapped to the standard partition. The default partition has no workloads mapped to it in the present illustration, given that it handles system requests, as opposed to requests provided from user accounts.

Figure 9:
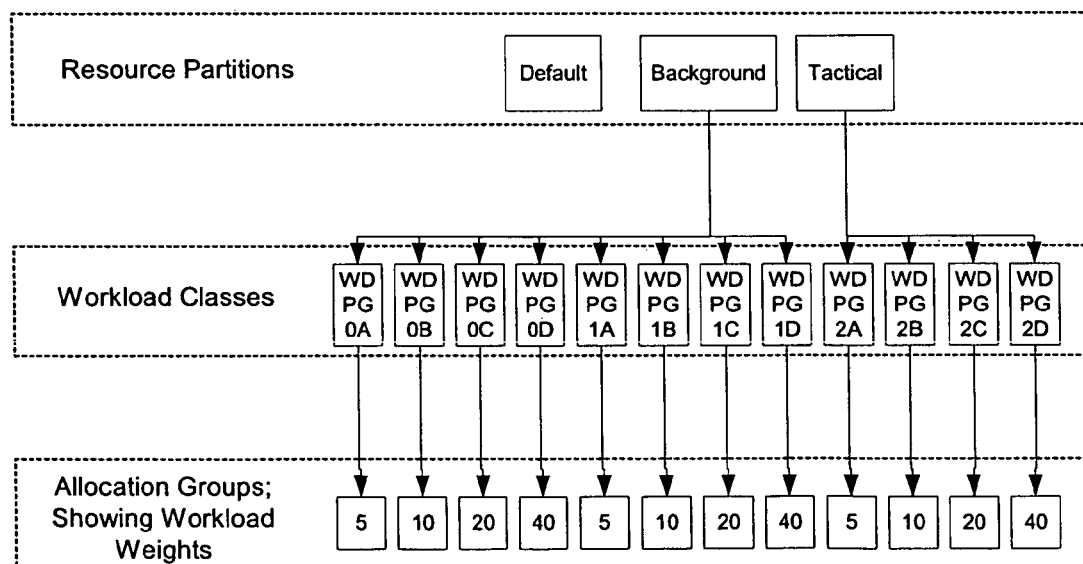
FIG. 9 is a schematic illustration of PSF weight mapping following processing by another embodiment of the invention.

With reference to FIGS. 8 and 9, although the workload weights are the same, it will be appreciate that the relative weights differ given the altered resource partition mapping, in line with the above calculations.

A specific numerical example is provided in FIGS. 3 to 5 to provide an illustration of the calculations given above. The specific example tracks a particular set of performance groups and their weights as they are converted by 'as-is' mapping and 'simplified' mapping. In particular, FIG. 3 details specific performance groups and their weights, along with associated workloads. FIG. 4 details the weights for workload classes under 'as-is' mapping. FIG. 5 details the weights for workload classes under 'simplified' mapping.

These specific examples are used further below as part of a detailed run-through of an exemplary migration of a protocol 2. This is carried out with respect to a PSF settings migration from V2R5 to V2R6, and uses some terminology specific to this application. Particular reference is made to the flowchart of FIG. 2. The exemplary migration takes place following a migration of database 3 to database 11, that is, an upgrade from V2R5 to V2R6. To assist the disclosure, some exemplary screenshots of a particular PSF migration are provided. It will be appreciated that these are provided for illustration only, and are not intended to be limiting in any way.

The first step is to open a software application shell that provides an option to begin the migration process. It will be appreciated that this shell provides access to the functionality of system 1, and is integrated into a pre-existing software application in some embodiments. As such, administrator 12 selects an option to begin the migration process at 20.

Figure 10:
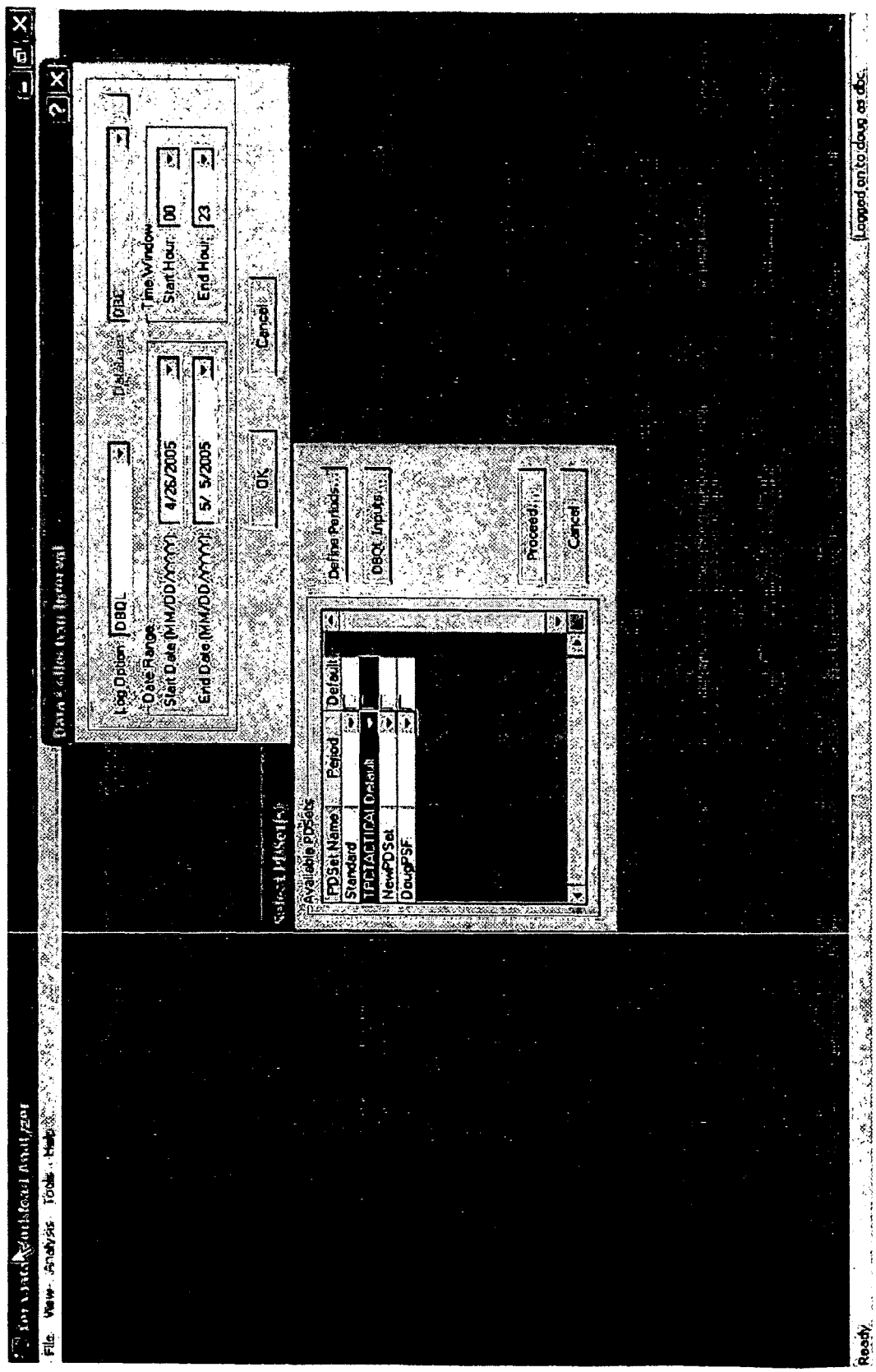

In this embodiment, system 1 automatically scans the directory containing PSF settings and identifies any scheduled PD sets at 21. A protocol 2 often includes a number of PD sets, these being alternate weight settings. For the sake of this disclosure, a protocol 2 consists or one or more PD sets that are nominated by administrator 12. Different PD sets are able to assign differing weights to performance groups. For example, a first performance group is mapped to a first weight in one PD set, and to a second weight in a second PD set. A screenshot indicative of this step is provided in FIG. 10.

Under V2R6, it is necessary to define workload periods for each PDSet that will be migrated. For Example, PDSET1=Morning, PDSET2=Afternoon, PDSET 3=evening, PDSET4=Default, and so on. The notion is that a scheduled PD set runs at a scheduled time, and continues to run until an alternate set runs. Workload periods are defined in 24/7 time. That is, a particular set or workload definitions apply in predetermined time windows.

If one or more PD sets are scheduled, administrator 15 views these sets and selects one or more of these as defining protocol 2. The selected sets are automatically processed to derive workload periods at 23. That is, is an existing set was active from time X to time Y, workloads groups associated with performance groups in that set will also be active from time X to time Y. It will be appreciated that this often involves defining multiple workload classes for each performance group—for example a first workload class for time X to time Y, and a second for time Y to time Z.

As a specific example, consider a protocol 2 including three PD sets:
PDSetA, scheduled to run at 8.00 AM.
PDSetB, scheduled to run at 5.00 PM.
PDSetC, scheduled to run at 00.00 AM.

In this case, three workload periods are automatically defined by interface 4:
Period 1, active from 8.00 AM to 4.59.59 PM.
Period 2, active from 5.00 PM to 11.59.59 PM.
Period 3, active from 00.00 AM to 7.59.59 AM.

It will be appreciated that Period 1 will relate to workload classes defined on the basis of performance group weights in PDSetA, and so on.

If the relevant PD sets are not scheduled, if administrator 12 wishes to manually define workload periods for given reasons, or if a combination of scheduled and unscheduled sets are to be used, administrator 12 views and selects PD sets at 22. Also at this point, administrator 12 manually inputs the necessary scheduling information. If no scheduling information is given for a set, it is assumed that the set in question is to be active at all times—24/7.

The compatibility of PD sets is first checked at box 53. It will be appreciated that there are various reasons for which PD sets might not be compatible, such as conflicting weightings or periods. These incompatibilities are manually resolved by administrator 12 before continuing. For example, workload periods are defined in 24/7 time. As such, where the scheduling information does not inherently provide for a conversion into 24/7 time, some user input is required. Interface 4 ensures the sets are compatible at 25. Alternately, if a given period has no scheduling information, and hence is assumed to run 24/7, it will often conflict with a scheduled set running form time X to time Y. If the sets are not compatible, step 24 is repeated such that administrator 15 is able to resolve the conflict. If they are compatible, periods are defined at 26. These are defined in terms of performance groups, and subsequently used to define workload periods.

Figure 11:
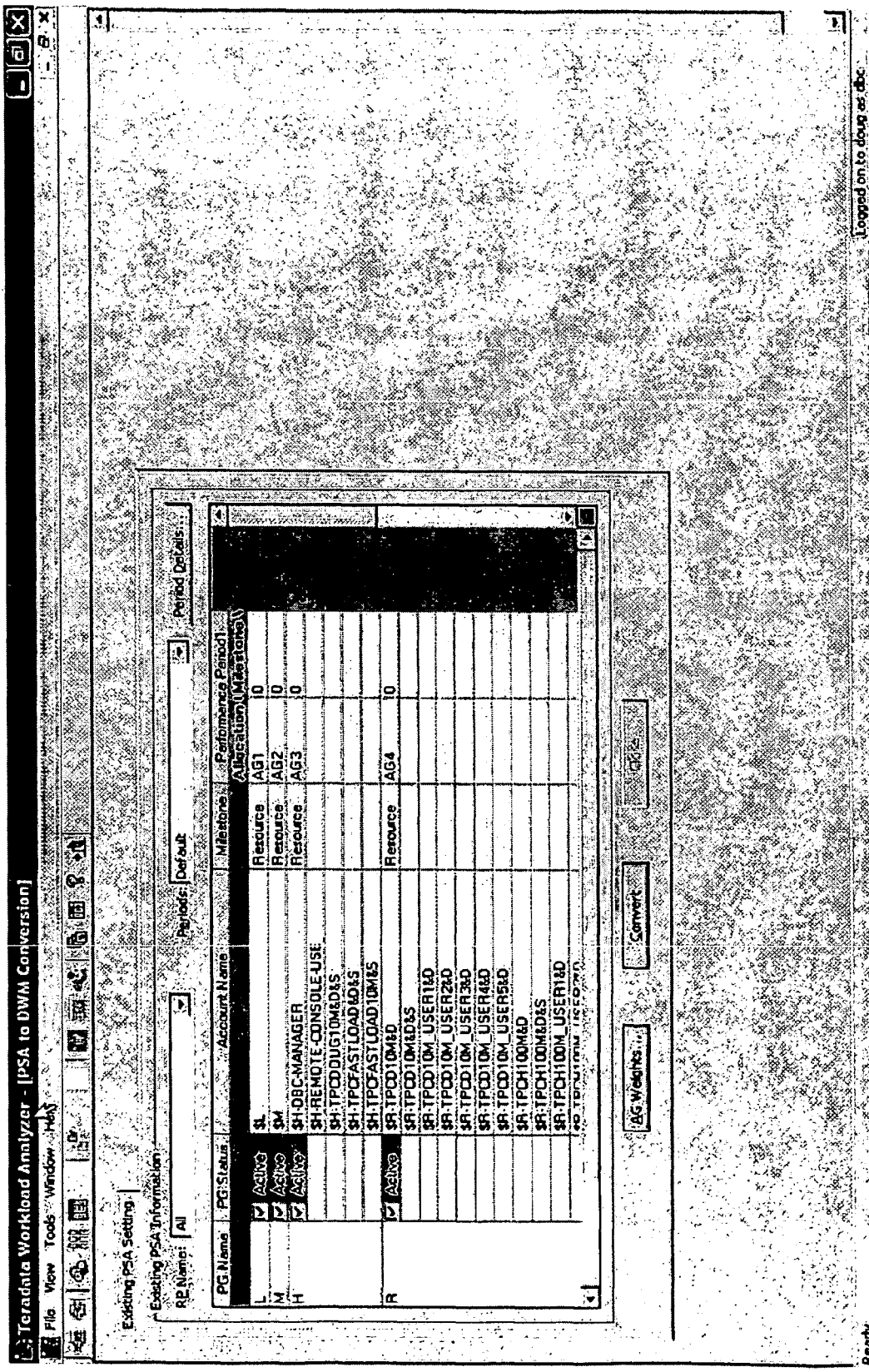
Figure 12:
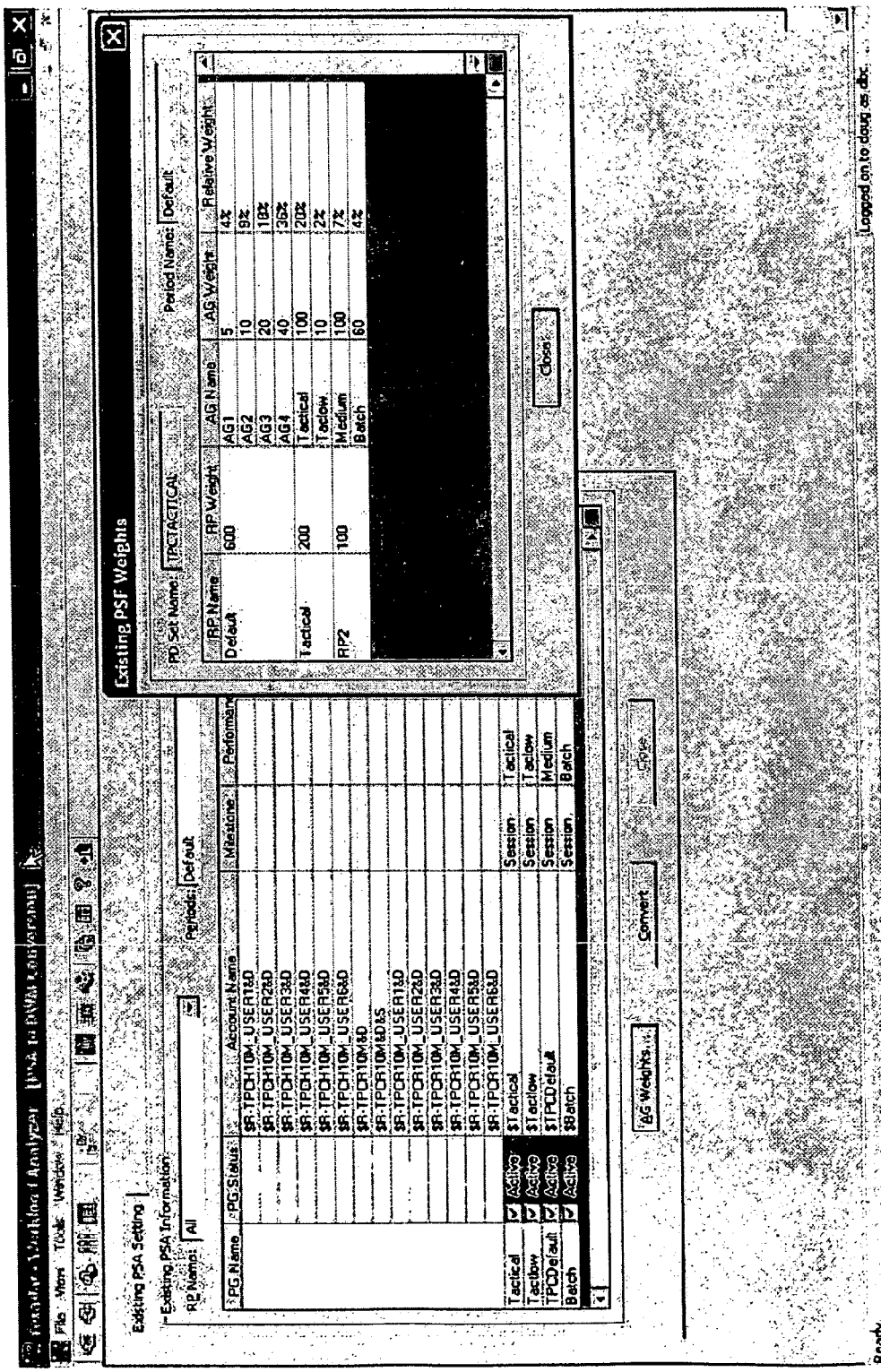

Administrator 12 determines whether the nerformance groups referenced by the protocol are active or inactive at 27. There are two major options for achieving this. Firstly, the process is carried out manually. That is, administrator 12 manually determines whether a given performance group is active or inactive. Secondly, by providing a relevant instruction, the determination is automated. For example, an interval is set over which the Database Query Log (DBQL) of database 3 is searched. As a result of this search, and on the basis of whether a performance group has been active over a predetermined period of time, active or inactive status is automatically assigned. Exemplary screenshots of this process are shown in FIGS. 11 and 12.

Figure 6:
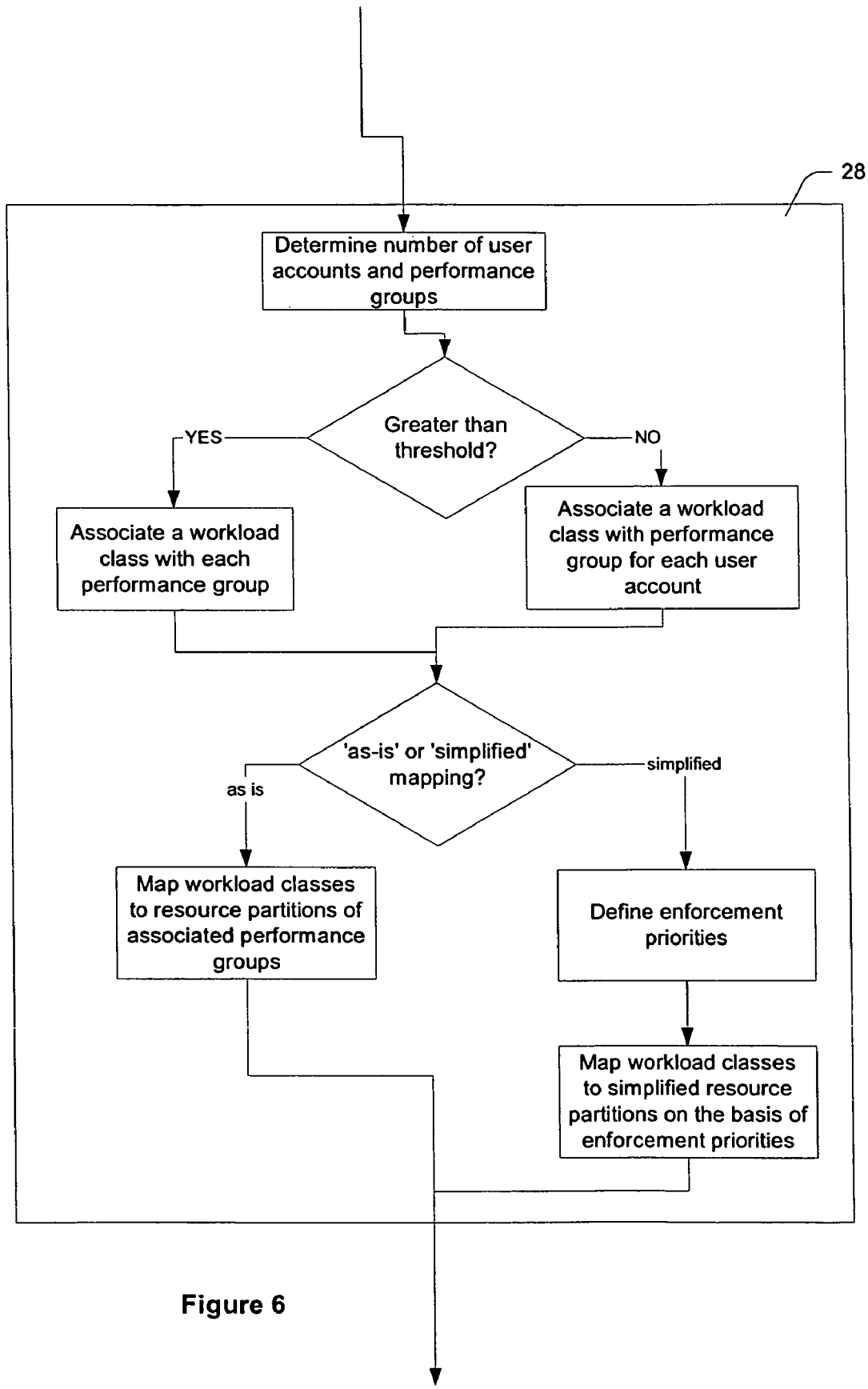
FIG. 6 is a more detailed flowchart showing step 28 of FIG. 2.

The bulk of the activity of processor 7 occurs at 28, shown in more detail at FIG. 6. At this step processor 7 is responsive to the number of user accounts. If the number of user accounts is less than a threshold, being thirty-six in this embodiment, processor 5 defines a workload class for each referenced user account performance group and associates each user account to the workload class defined for that user account performance group. If the number is greater than the threshold, processor 7 defines a workload class for each referenced performance group and associates each user account in a performance group to the workload class defined for that performance group. The rationale for a threshold of thirty six in the present embodiment is that a maximum of 40 workload classes are available under in the present embodiment. As mentioned above, four of these are reserved for system runs—"rush", "high", "medium" and "low".

Figure 13:
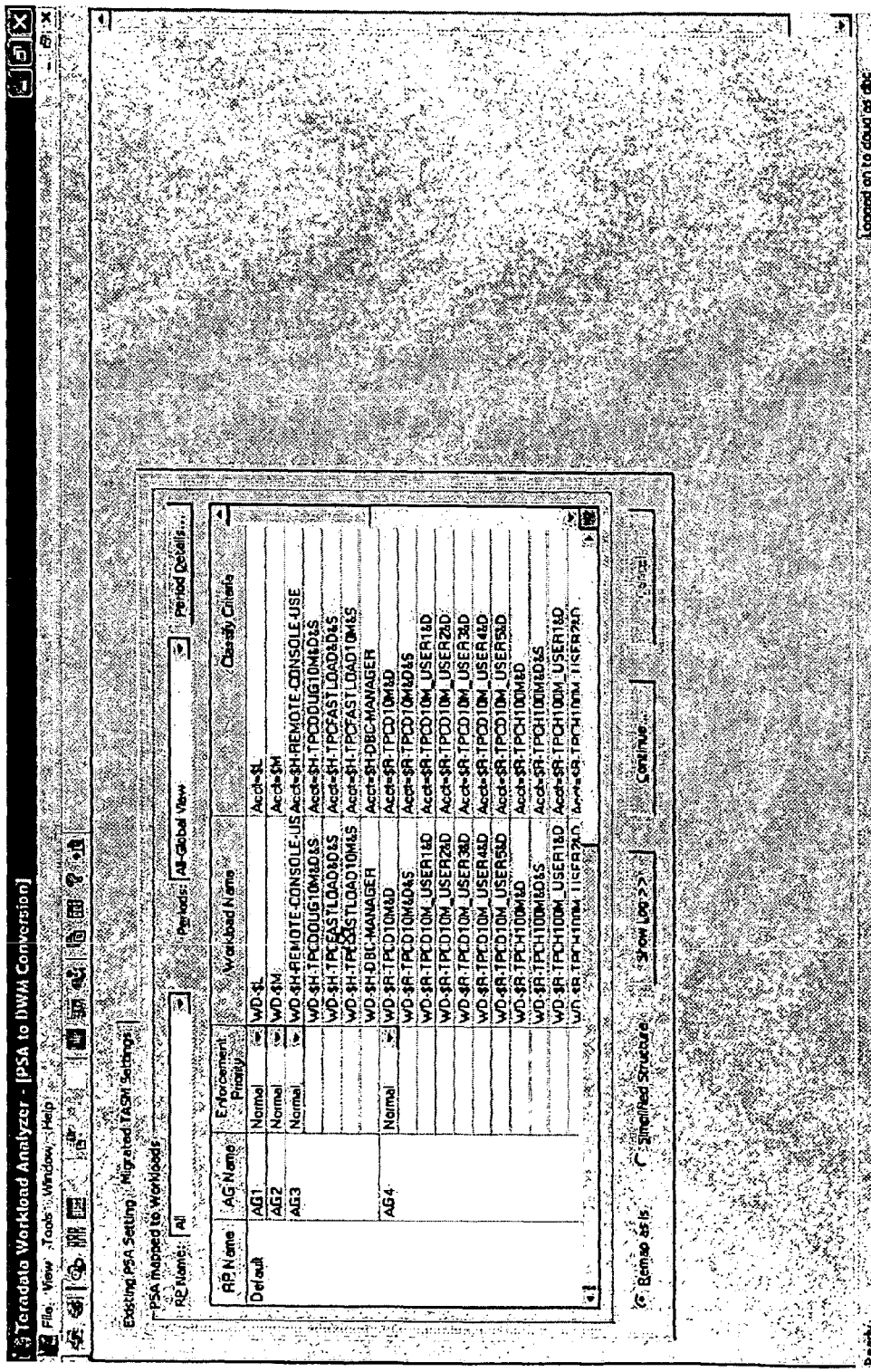
Figure 14:
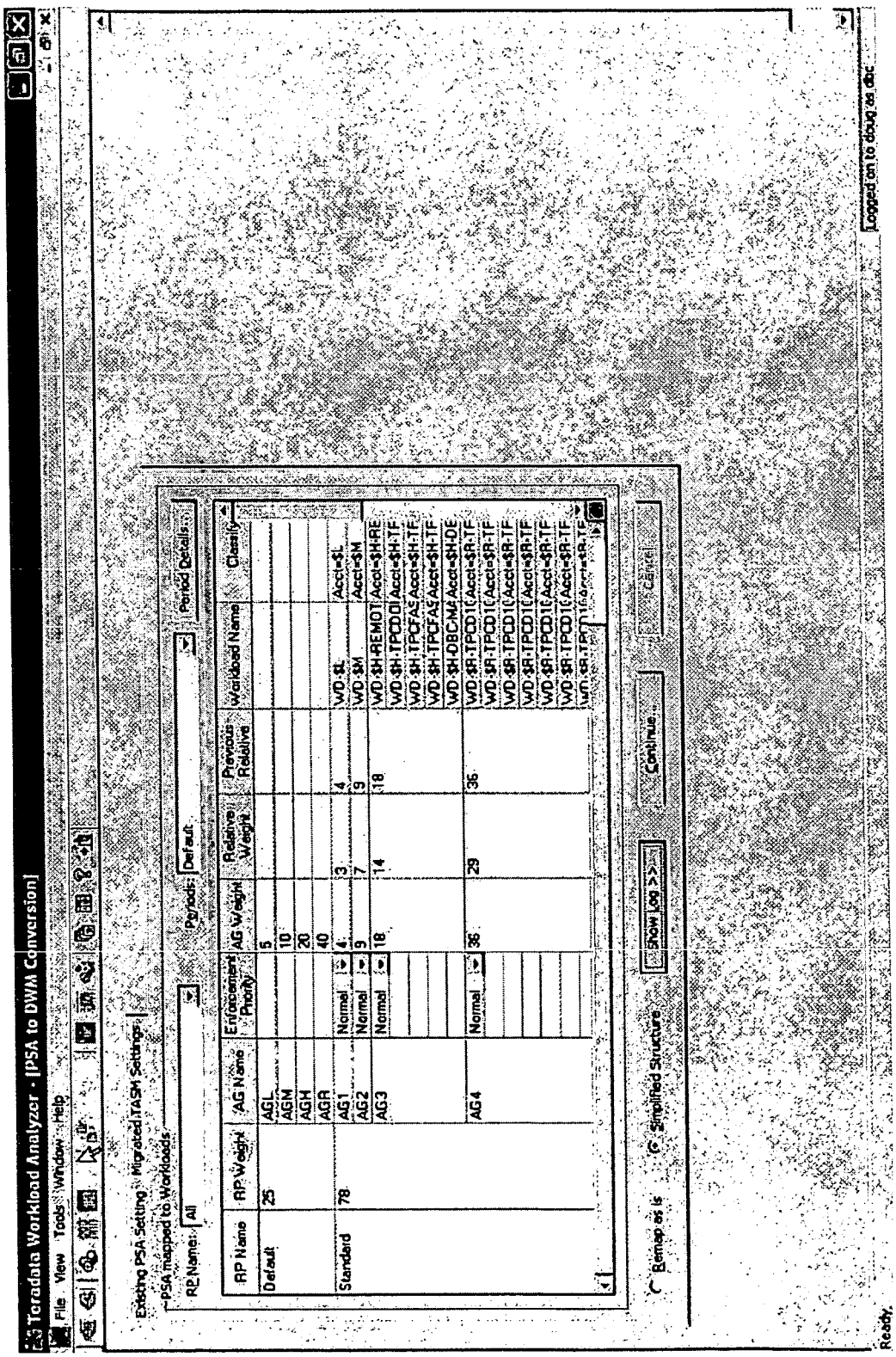
Figure 15:
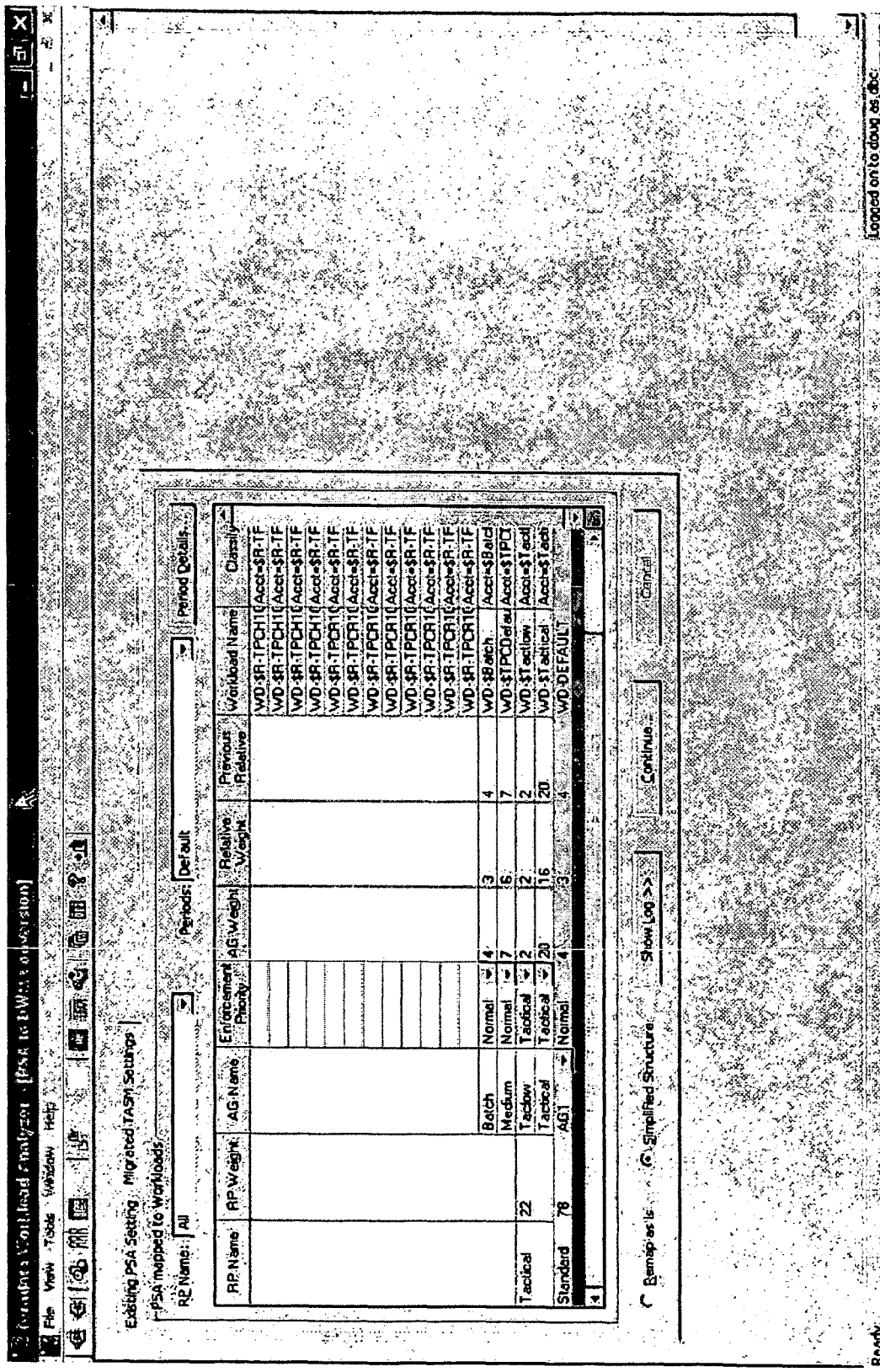
Figure 16:
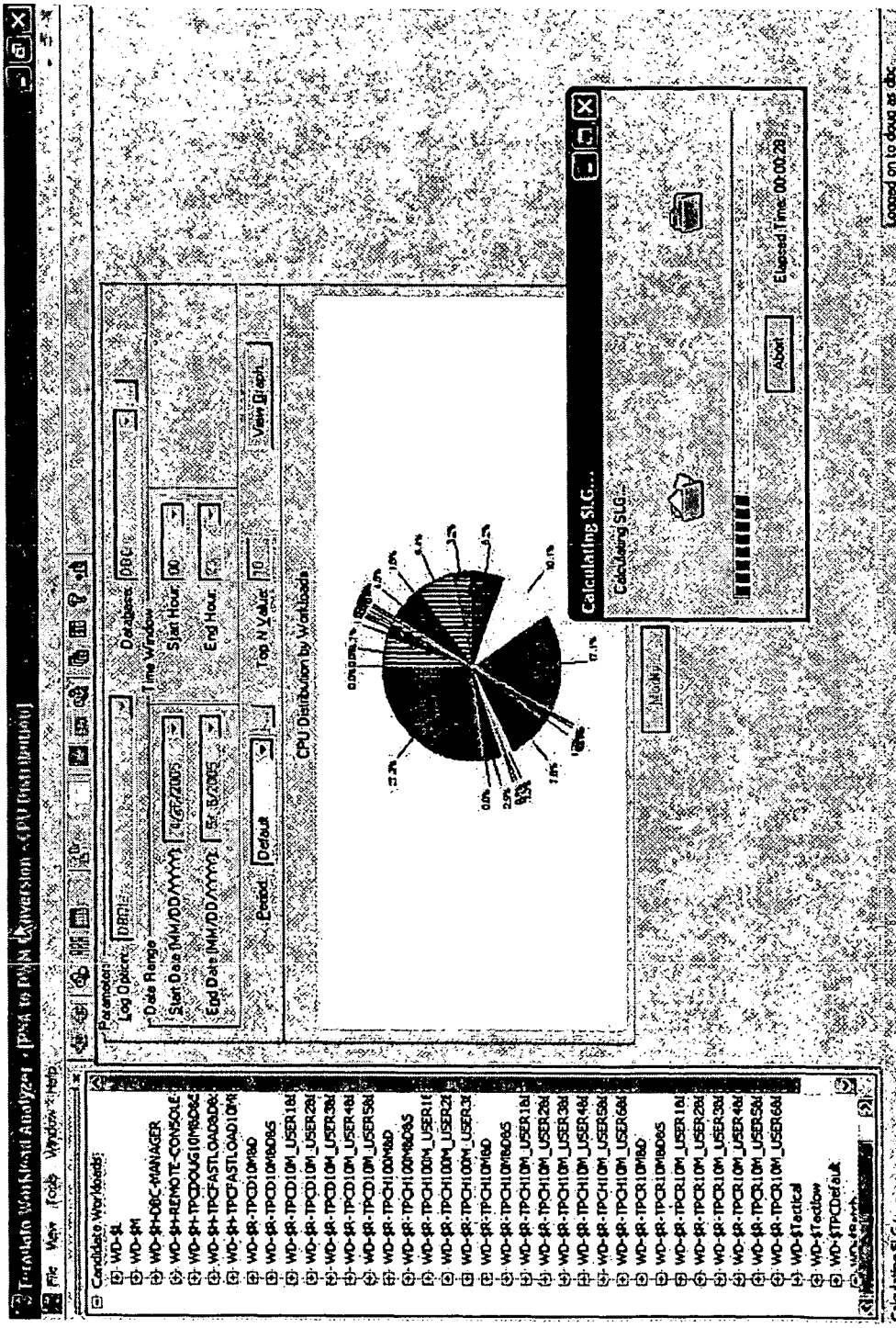
Figure 17:
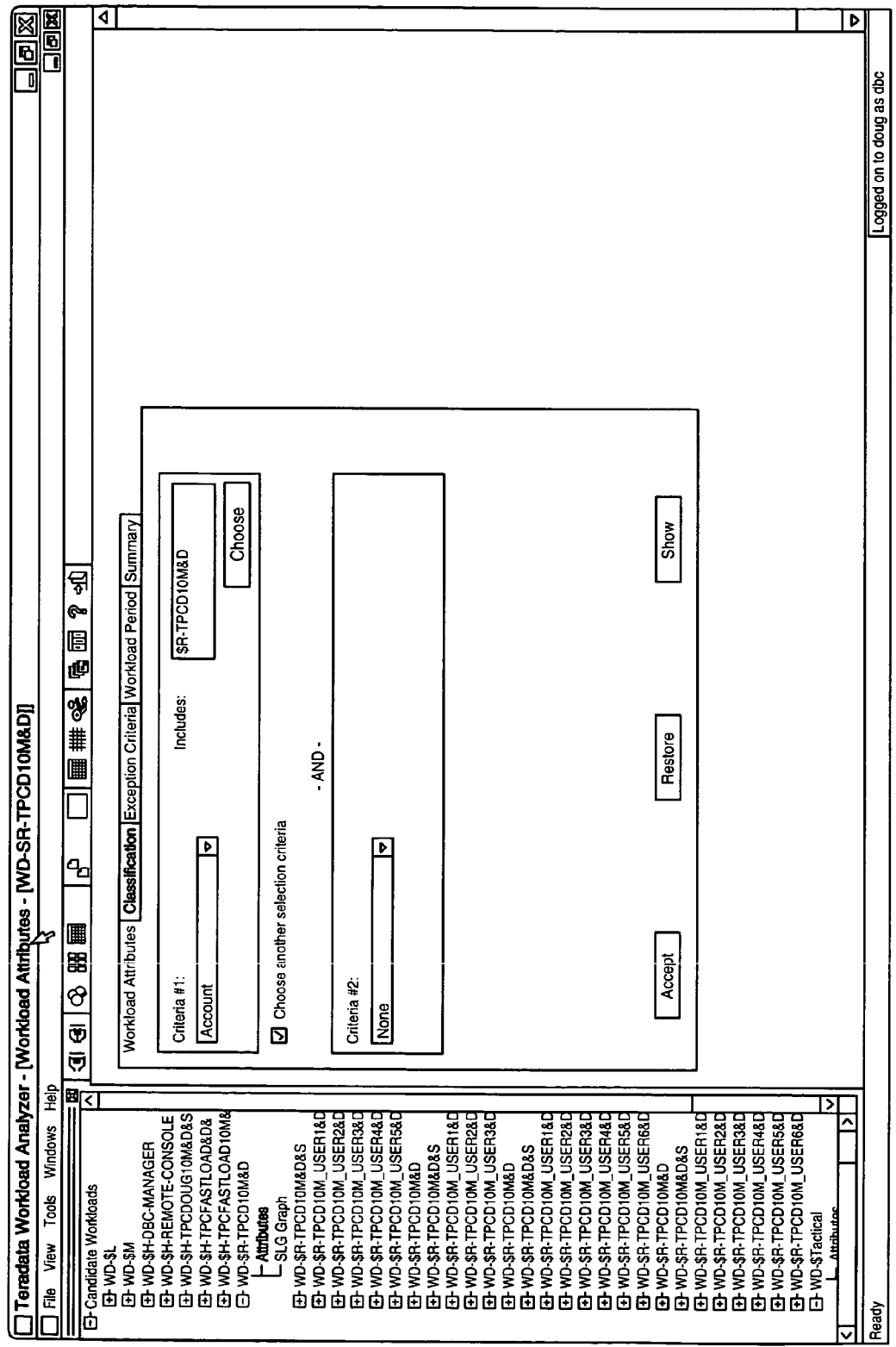
Figure 18:
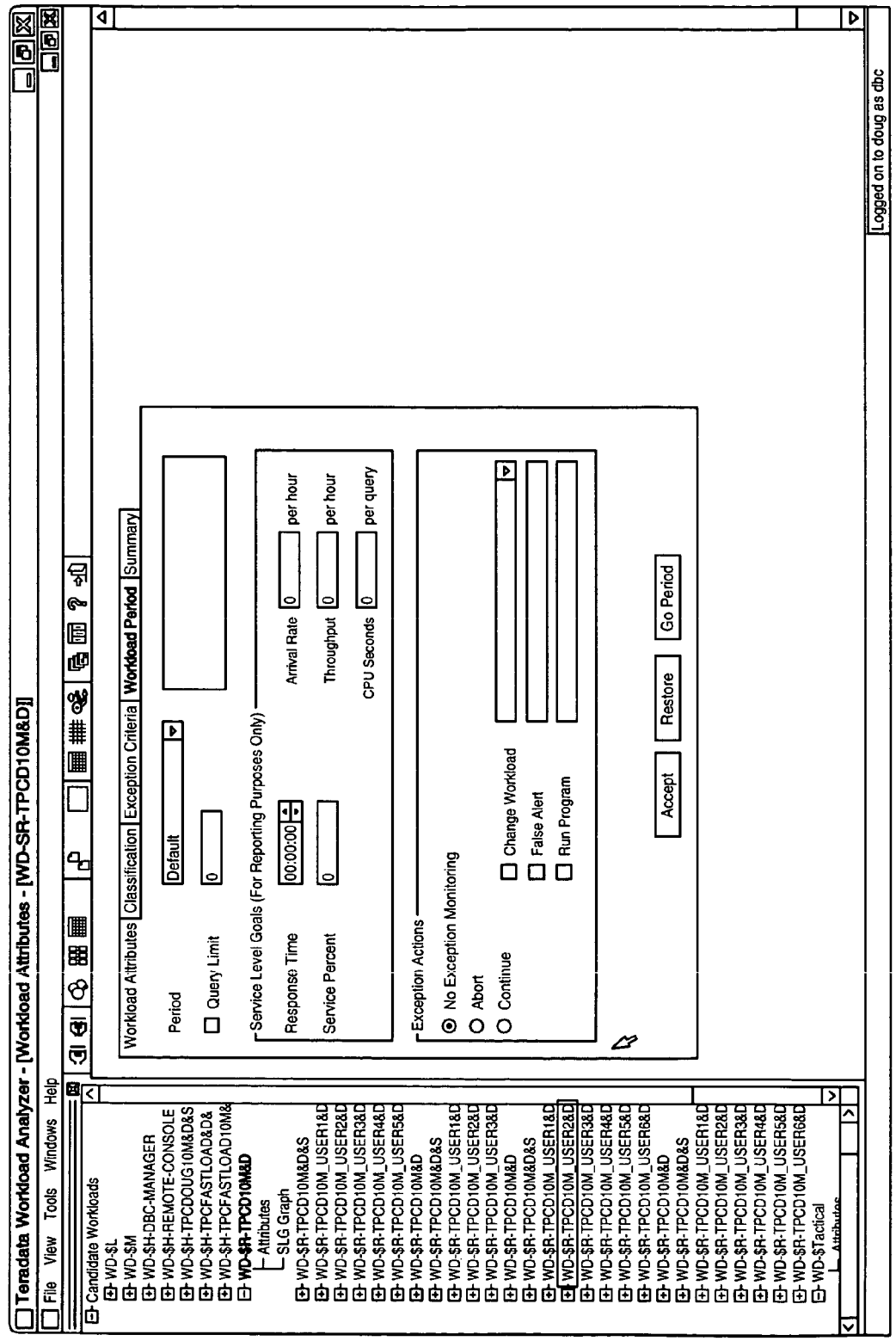
Figure 19:
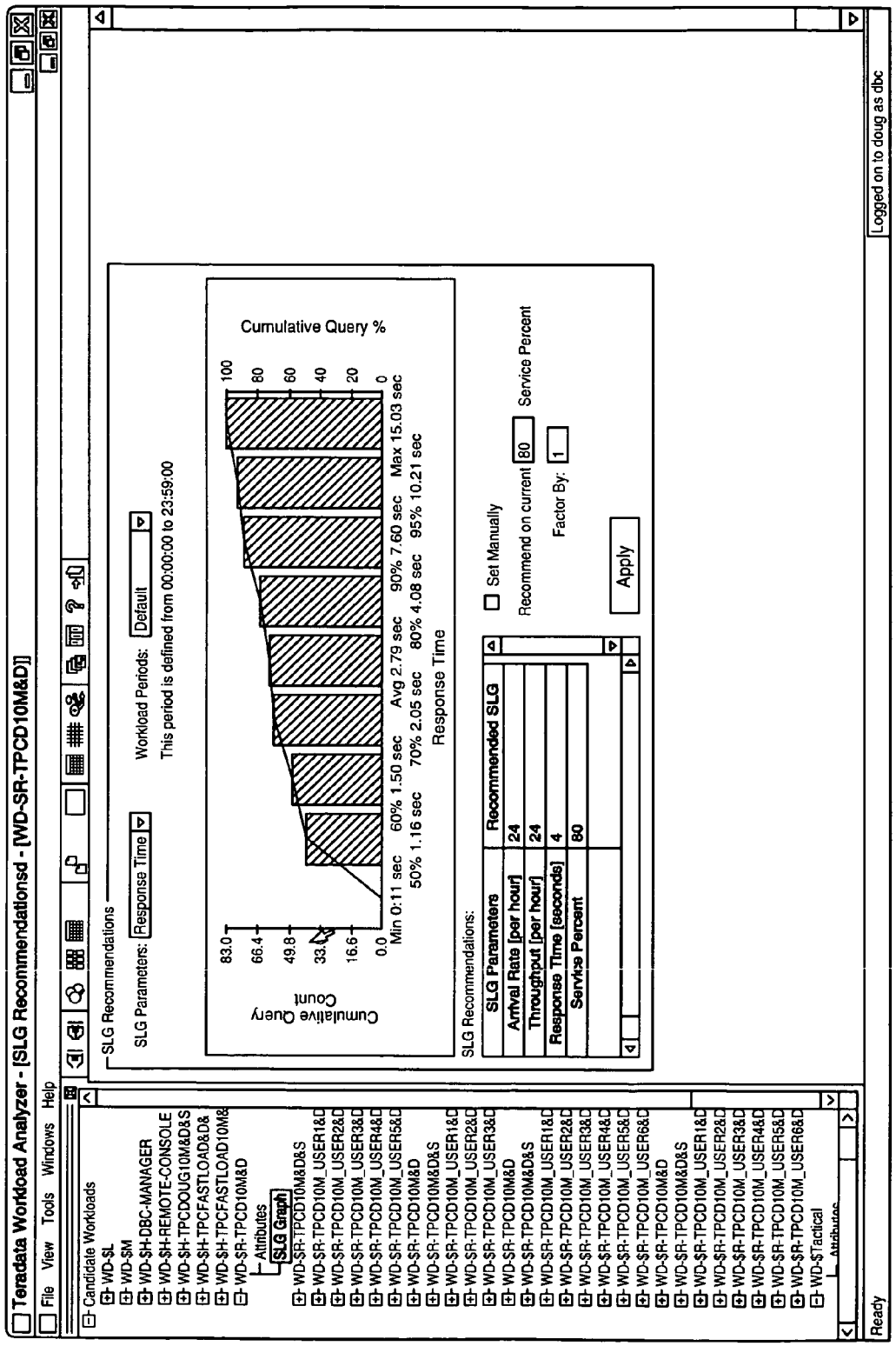

As outlined above, administrator 12 is presented with two options for progression—'simplified' mapping or 'as-is' mapping. The results of these were discussed by reference to FIGS. 3 to 5. FIG. 13 is an exemplary screenshot where 'as-is' mapping is used. FIGS. 14 and 15 provide an example relating to 'simplified' mapping.

At 29, administrator 12 has the option of assigning service level goals (SLGs) for the defined workloads. This is typically carried out though the use of a graphical user interface and in accordance with the general principles for assigning SLGs in a Teradata CLSM-type database at 30. In the present embodiment there are two options:

An automated process, which leverages other functionalities within the DMBS to assign SLGs in accordance with predetermined principles.

A manual process whereby individual SLGs for one or more workload classes are defined manually.

FIGS. 16 to 19 illustrate an exemplary procedure for assigning SLGs within a PSF migration.

Regardless of whether SLGs are defined, the process completes at 31. At 31 the modified PSF settings, being protocol 9—are saved as "rule-sets" in the data directory for CLSM. As such, PSF runs under protocol 9 following step 31, and operates suitably with database 11. In FIG. 20, saving a 'rule-set' is identified by 'creating a workload summary'.

Figure 2:
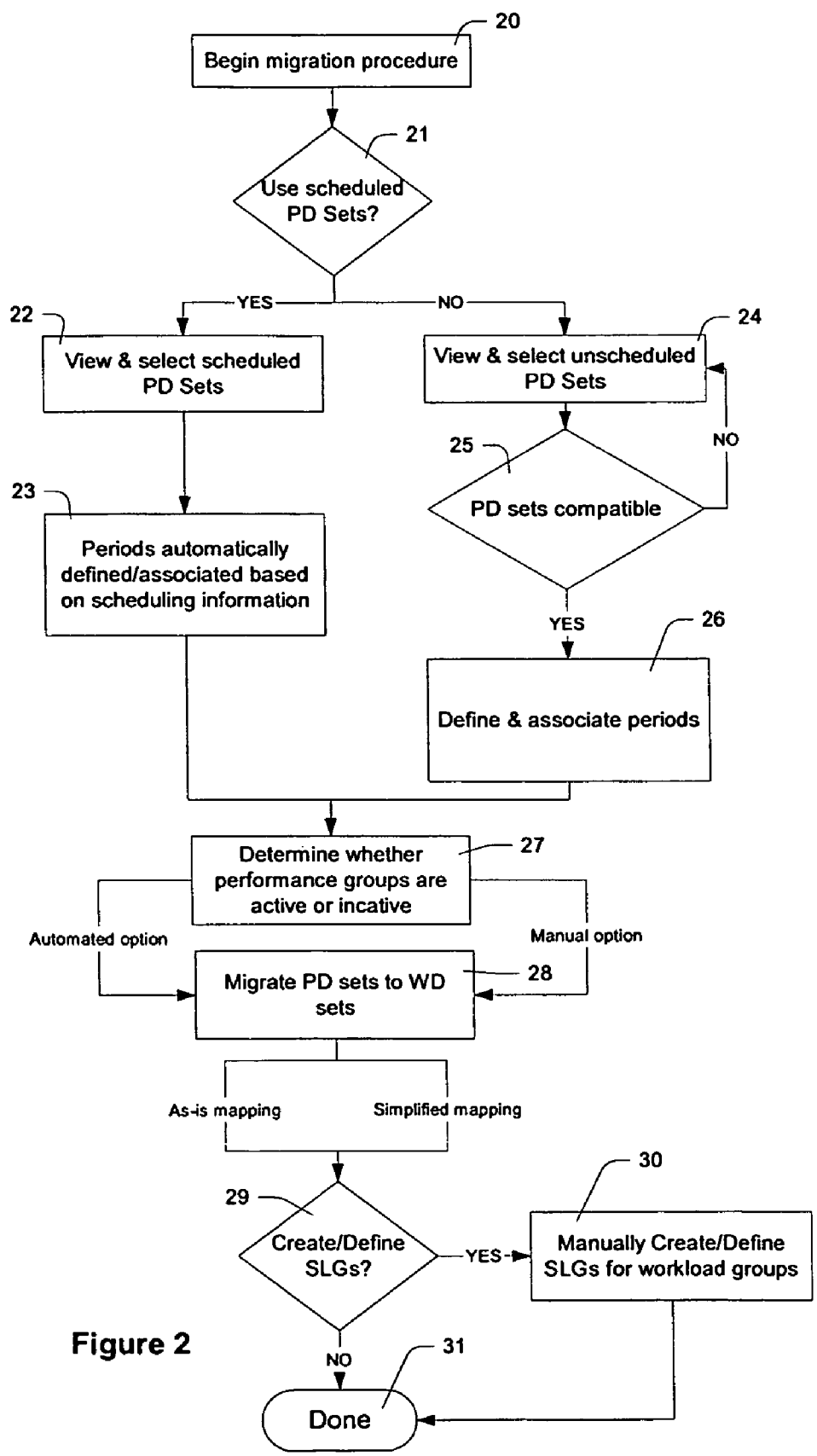
FIG. 2 is a flowchart illustrating an exemplary method according to an embodiment of the present invention.

It will be appreciated that the exemplary method of FIG. 2 allows for the migration of PSF settings from Teradata V2R5 to V2R6. The embodiments are not limited by this application, and those skilled in the art will readily recognize modifications and variations that allow the teaching to be applied in various other circumstances.

Although the present invention has been described with particular reference to certain preferred embodiments thereof, variations and modifications of the present invention can be effected within the spirit and scope of the following claims.

What is claimed is:

1. A system for processing a prioritizing protocol for a database, the system including:
   an interface for nominating a first prioritizing protocol that maps a plurality of user accounts to one or more performance groups and to one or more periods;
   a processor that is responsive to the interface for defining a second prioritizing protocol by:
      defining a plurality of workload classes;
      associating each user account to a particular workload class; and
      mapping each workload class to a workload weight; and
   an output in communication with the processor for exporting the second prioritizing protocol.

2. A system according to claim 1 wherein the first protocol:
   maps a group weight to a performance group to which user accounts are assignable such that each user account has an associated group weight; and
   prioritizes a request from a user account in response to the associated group weight of that user account.

3. A system according to claim 2 wherein the second protocol:
   maps a workload weight to a performance group to which requests are attributable such that each request has an attributed workload weight; and
   prioritizes a request from a user account in response to the attributed workload weight of that request.

4. A system according to claim 3 wherein a request from a user account has a associate group weight and an equal attributed workload weight.

5. A system according to claim 4 wherein a group weight belongs to one of a plurality of existing resource partitions, and the equal workload weight belongs to the same existing resource partition.

6. A system according to claim 4 wherein a wherein a group weight belongs to one of a plurality of existing resource partitions, and the equal workload weight is mapped to one of a plurality of simplified resource partitions defined by the processor.

7. A system according to claim 6 wherein an enforcement priority corresponding to a simplified resource partition is allocated to each workload class, and the processor maps the workload weight for the allocated workload class to the corresponding simplified resource partition.

8. A system according to claim 7 wherein the enforcement priorities denote workload classes as being of a particular character.

9. A system according to claim 8 wherein workload classes of a single genre of character are mapped to a reselected simplified resource partition.

10. A system according to claim 9 wherein, wherein each existing resource partition has a standard weight and each simplified resource partition has a simplified weight.

11. A system according to claim 1 wherein the output allows a user to selectively set service level goals for each workload class.

12. A system according to claim 1 wherein the first prioritizing protocol and second prioritizing protocol are each used by a priority scheduling application.

13. A system according to claim 1 wherein the interface conforms the nominated prioritizing protocol for compliance with predetermined standards.

14. A system according to claim 13 wherein conforming the first protocol includes either or both of identifying and defining period rules for the protocol.

15. A system according to claim 14 wherein the interface is responsive to the period rules for determining workload periods.

16. A system according to claim 1 wherein confirming the nominated protocol includes determining whether one or more performance groups referenced by the protocol are active or inactive.

17. A system according to claim 16 wherein the determination is performed on the basis of either or both of an input from a user and an examination of a request log of the database.

18. A system according to claim 1 wherein the first protocol references a plurality of user accounts and a plurality of performance groups and the processor selectively either:
   defines a workload class for each referenced user account and associates each user account to the workload class defined for that user account; or
   defines a workload class for each referenced performance group and associates each user account in a performance group to the workload class defined for that performance group.

19. A system according to claim 18 wherein the processor is selective in response to the number of referenced user accounts and the number of referenced performance groups.

20. A system according to claim 1 wherein the output allows for selective determination of service level goals for one or more workload classes.

21. A method for processing a prioritizing protocol for a database, the method including the steps of:
   nominating a first prioritizing protocol that maps a plurality of user accounts to one or more performance groups and to one or more periods;
   defining a second prioritizing protocol by:
      defining a plurality of workload classes;
      associating each user account to a particular workload class; and
      mapping each workload class to a workload weight; and
   exporting the second prioritizing protocol.

* * * * *